US009729499B2

(12) United States Patent
Dong et al.

(10) Patent No.: US 9,729,499 B2
(45) Date of Patent: Aug. 8, 2017

(54) BROWSER AND METHOD FOR DOMAIN NAME RESOLUTION BY THE SAME (71) Applicant: BEIJING QIHOO TECHNOLOGY COMPANY LIMITED, Beijing (CN)

(72) Inventors: Binyan Dong, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 203 days.

(21) Appl. No.: 14/431,981

(22) PCT Filed: Sep. 6, 2013

(86) PCT No.: PCT/CN2013/083082
§ 371 (c)(1),
(2) Date: Mar. 27, 2015

(87) PCT Pub. No.: WO2014/048241
PCT Pub. Date: Apr. 3, 2014

(65) Prior Publication Data
US 2015/0244670 A1 Aug. 27, 2015

(30) Foreign Application Priority Data

Sep. 29, 2012 (CN) .......................... 2012 1 0379513

(51) Int. Cl.
H04L 29/12 (2006.01)
G06F 17/30 (2006.01)
(Continued)

(52) U.S. Cl.
CPC ........ H04L 61/1511 (2013.01); G06F 9/5005 (2013.01); G06F 17/30887 (2013.01); H04L 67/02 (2013.01)

(58) Field of Classification Search
None
See application file for complete search history.

(56) References Cited

U.S. PATENT DOCUMENTS 8,214,691 B1 * 7/2012 Spalink ................... H04L 43/50
714/28
2002/0116444 A1 * 8/2002 Chaudhri ............... H04L 67/42
709/201

(Continued)

OTHER PUBLICATIONS

Hu , Youhuan et al., English abstract only of Chinese application No. CN102663012 A, Webpage preloading method and system, publication date Sep. 12, 2012, one page.

(Continued)

Primary Examiner — Thomas Dailey
(74) Attorney, Agent, or Firm — James M. Stipek; John R. Bednarz; Polsinelli PC (57) ABSTRACT Disclosed are a browser and a method for domain name resolution by the same. The method comprises: starting the browser and calling DNS acceleration data information, wherein the DNS acceleration data information comprises several domain names obtained in advance and IP address information corresponding to each domain name; receiving an access request for a certain URL initiated by a user, parsing the access request and extracting the domain name corresponding to the URL; and detecting whether the domain name corresponding to the URL is contained in the DNS acceleration data information, and if yes, obtaining the IP address information corresponding to the domain name, and utilizing the IP address information for access processing. By conducting statistics on some primary domain names in advance to form DNS acceleration data information, the disclosure may implement webpage browsing acceleration when the DNS acceleration data information is called by a user-side browser. Such a procedure of acceleration processing consumes a short time, and improves the efficiency of DNS acceleration.

20 Claims, 6 Drawing Sheets (51) Int. Cl.
*G06F 9/50* (2006.01)
*H04L 29/08* (2006.01)

(56) References Cited

U.S. PATENT DOCUMENTS

| 2005/0108710 | A1* | 5/2005 | Patiejunas | H04L 29/06 |
| | | | | 718/100 |
| 2011/0153867 | A1* | 6/2011 | van de Ven | H04L 29/12811 |
| | | | | 709/245 |
| 2013/0111040 | A1* | 5/2013 | Vempati | H04L 63/029 |
| | | | | 709/227 |

OTHER PUBLICATIONS

Yuchi, Xuebiao et al., English abstract only of Chinese application No. CN102572011 A, Method, device and system for processing data, publication date Jul. 11, 2012, one page.

Zhang, Shuihua et al., English abstract only of Chinese application No. CN102546854 A, Domain name analysis method for building hyper text transport protocol (HTTP) connection for domain name and server, publication date Jul. 4, 2012, one page.

International Search Report regarding PCT/CN2013/083082, issued Dec. 19, 2013, 4 pages.

Dong, Binyan et al., English abstract only of Chinese application No. CN102340554 A, Optimal application server selection method and device for domain name system (DNS), publication date Feb. 1, 2012, one page.

\* cited by examiner

BROWSER AND METHOD FOR DOMAIN NAME RESOLUTION BY THE SAME

FIELD OF THE INVENTION

The present disclosure relates to the field of Internet technology, and in particular, to a browser and method for domain name resolution by the same.

BACKGROUND OF THE INVENTION

Nowadays, when accessing a specified URL (Uniform Resource Locator), a browser obtains the root content of the URL, parses the root content, and establishes a corresponding network request. It is thus clear that in the prior scheme, parsing is not done until a user inputs a web address, and the HTML (Hypertext Markup Language) data content is analyzed after a root URL is downloaded, and then download is done according to an object needing to be rendered. Wherein, DNS resolution needs to be done before the object needing to be rendered is downloaded, however, the time for the DNS resolution may range from a few milliseconds to 100 s, and therefore the time consumed will be relatively long when the prior scheme is employed to access a URL.

In order to solve the problem of the DNS resolution being time consuming, currently, there are several DNS pre-fetching techniques particularly as follows:

1) informing a browser via meta information that it needs to do DNS pre-fetching, for example, <meta http-equiv="x-dns-prefetch-control" content="on"/>;

2) using a Link label to forcibly do the DNS pre-fetching, for example, <link rel="dns-prefetch" href="http://some-web-site.com"/>;

3) when the address bar is changed, guessing a related suffix, for example, when a user inputs www.sina, guessing such a domain name as www.sina.com, www.sina.org, www.sina.gov, etc. is to be inputted.

However, in the DNS pre-fetching techniques described above, a Link label needs to be specified, and the problem of DNS acceleration cannot be solved for a large number of currently existing webpages. In addition, it is not cost-effective if a webpage is upgraded only for DNS acceleration, and pre-reading for an undesired connection wastes network resources and increases the network traffic cost.

SUMMARY OF THE INVENTION

In view of the above problems, the present disclosure is proposed to provide a browser, a method and a program for domain name resolution by the browser, which overcomes the above problems or at least in part solve the above problems.

According to an aspect of the embodiments of the present disclosure, there is provided a method for domain name resolution by a browser comprising: starting the browser and calling DNS acceleration data information, wherein the DNS acceleration data information comprises several domain names obtained in advance and IP address information corresponding to each domain name; receiving an access request for a certain URL initiated by a user, parsing the access request and extracting the domain name corresponding to the URL; and detecting whether the domain name corresponding to the URL is contained in the DNS acceleration data information, and if yes, obtaining the IP address information corresponding to the domain name, and utilizing the IP address information for access processing.

Correspondingly, the present disclosure further provides a browser comprising: a calling module configured to start the browser and calling DNS acceleration data information, wherein the DNS acceleration data information comprises several domain names obtained in advance and IP address information corresponding to each domain name; an acceleration triggering module configured to receive an access request for a certain URL initiated by a user, parse the access request and extract the domain name corresponding to the URL to trigger an acceleration executing module; and the acceleration executing module configured to detect whether the domain name corresponding to the URL is contained in the DNS acceleration data information, and if yes, obtain the IP address information corresponding to the domain name, and utilize the IP address information for access processing.

According to yet another aspect of the embodiments of the present disclosure, there is provided a computer program comprising a computer readable code which causes a user terminal to perform the method for domain name resolution by a browser according to any of claims 1-10, when said computer readable code is running on the user terminal.

According to still another aspect of the embodiments of the present disclosure, there is provided a computer readable medium storing the computer program as claimed in claim 21 therein.

The beneficial effects of the invention lie in that: first, by conducting statistics on some primary domain names in advance to form DNS acceleration data information, the technical solutions of the present disclosure may implement webpage browsing acceleration when the DNS acceleration data information is called by a user-side browser, and such a procedure of acceleration processing consumes a short time, and improves the efficiency of DNS acceleration; second, the technical solutions of the disclosure may further perform acceleration processing on a URL where a mouse hovers, and have a wide range of applications.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. Wherein.

DETAILED DESCRIPTION OF THE INVENTION

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

To solve the technical problems existing in the prior art, embodiments of the present disclosure provide a browser and method for domain name resolution by the same. By conducting DNS query request statistics on some websites in advance to form DNS acceleration data information, the invention implements webpage browsing acceleration and improves the efficiency of DNS acceleration by calling the DNS acceleration data information when a user inputs a website address.

In the following, the implementation procedures of the invention will be elaborated through several specific embodiments particularly as follows.

First Embodiment

Figure 1:
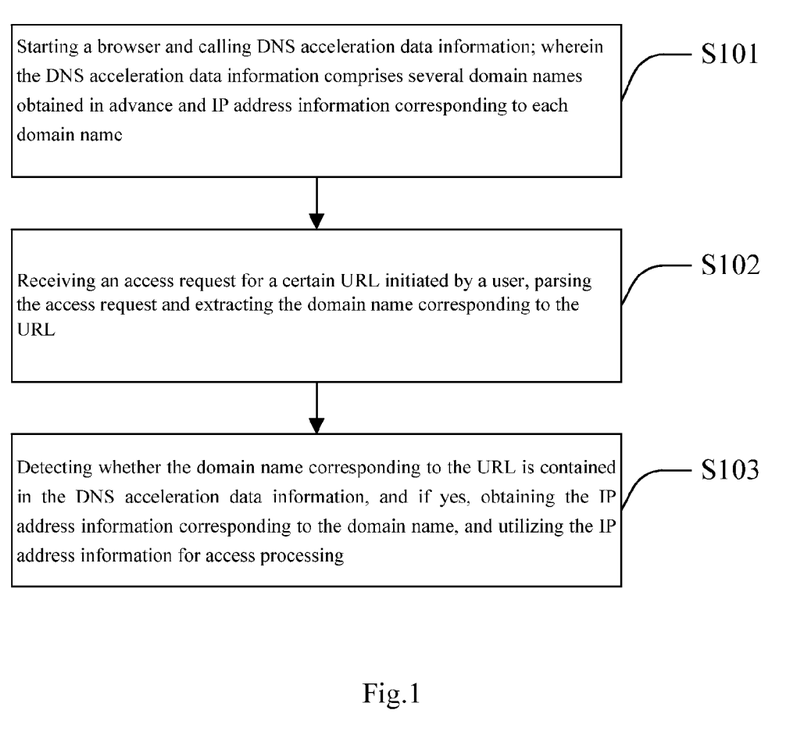
FIG. 1 is a flow chart of a method for domain name resolution by a browser provided by a first embodiment of the present disclosure.

As shown in FIG. 1, the embodiment of the present disclosure provides a method for domain name resolution by a browser, which in particular comprises the following steps.

In step S101, a browser is started and DNS acceleration data information is called; wherein the DNS acceleration data information comprises several domain names obtained in advance and IP address information corresponding to individual domain names;

In this step, the several domain names obtained in advance comprise several primary domain names and a sub-domain name (preferably, a secondary sub-domain name) corresponding to each primary domain name.

In this step, the called DNS acceleration data information is information generated at a server side, and/or information generated at the browser side.

When generated at the server side, the called DNS acceleration data information is DNS acceleration data information downloaded at the server side, or received DNS acceleration data information pushed actively by the server side. Wherein, the way in which the DNS acceleration data information is generated at the server side comprises:

(1) selecting primary domain names one by one in a pre-configured primary domain name pool, and obtaining sub-domain names corresponding to the selected primary domain names and IP address information corresponding to the primary domain names and the individual sub-domain names;

(2) saving the individual primary domain names and their corresponding sub-domain names and IP address information of the individual domain names, and generating the DNS acceleration data information.

Preferably, in step (1), the way of obtaining sub-domain names corresponding to the primary domain names and IP address information corresponding to the primary domain names and the individual sub-domain names comprises:

(11) selecting primary domain names one by one in a primary domain name pool;

(12) intercepting the function of obtaining address information (e.g., the system function getaddrinfo( )) of the computer system at the browser side, and obtaining a sub-domain name corresponding to each of the primary domain names, and socket address structures corresponding to the primary domain names and the individual sub-domain names;

(13) obtaining the IP address information corresponding to the primary domain names and the individual sub-domain names according to the socket address structures.

Preferably, in step (2), the way of saving the individual primary domain names and their corresponding sub-domain names comprises: establishing a map table of the mapping relation between the primary domain names and the corresponding individual sub-domain names.

When generated at the browser side, the DNS acceleration data information is DNS acceleration data information obtained by the browser conducting statistics on URLs accessed by a user(s).

Wherein, the way of the browser obtaining the DNS acceleration data information comprises:

obtaining a URL accessed by a user and extracting the primary domain name corresponding to the URL;

intercepting the function of obtaining address information (the system function getaddrinfo( )) of the computer system at the browser side, and obtaining sub-domain names corresponding to the primary domain names, and socket address structures corresponding to the primary domain names and the individual sub-domain names;

obtaining the IP address information corresponding to the primary domain names and the individual sub-domain names according to the socket address structures; and storing the primary domain names, the individual sub-domain names corresponding to the primary domain names, and the IP address information corresponding to the individual domain names in the DNS acceleration data information.

In step S102, an access request for a certain URL initiated by a user is received, the access request is parsed and a domain name corresponding to the URL is extracted.

Preferably, in this step, before extracting a domain name corresponding to the URL, there is further comprised:

judging whether the URL has been cached locally, if no, then extracting a domain name corresponding to the URL, and performing step S103; and if yes, then not performing DNS acceleration processing.

In step S103, it is detected whether the domain name corresponding to the URL is contained in the DNS acceleration data information, and if yes, the IP address information corresponding to the domain name is obtained, and the IP address information is used for access processing.

In this step, detecting whether the domain name corresponding to the URL is contained in the DNS acceleration data information in particular comprises: judging whether the domain name corresponding to the URL is a primary domain name or a sub-domain name, if it is a primary domain name, searching the domain name directly in the map table; and if it is a sub-domain name, segmenting the sub-domain name to obtain a primary domain name corresponding to the sub-domain name, and taking the primary domain name as a search index, searching a corresponding domain name in the map table.

In this step, the way of extracting the IP address information corresponding to the domain name when it is detected that the domain name corresponding to the URL is contained in the DNS acceleration data information comprises:

inserting the domain name corresponding to the URL into a to-be-accelerated list, and informing a queue daemon thread; and the queue daemon thread creating a semaphore, and calling the IP address information of the domain name corresponding to the URL in the DNS acceleration data information, realizing the parsing of the domain name.

Furthermore, in the method described in the embodiment of the present disclosure, when IP address information corresponding to multiple domain names is obtained concurrently, the queue daemon thread is utilized to inform a pre-created thread pool to allocate threads to individual request tasks for obtaining IP address information, and the allocated individual threads are utilized to call the IP address information in the DNS acceleration data information, thereby realizing the parsing of the individual domain names.

To sum up, the technical solution described in the embodiment of the present disclosure implements webpage browsing acceleration and improves the efficiency of DNS acceleration by calling the DNS acceleration data information generated in advance.

Second Embodiment

Figure 2:
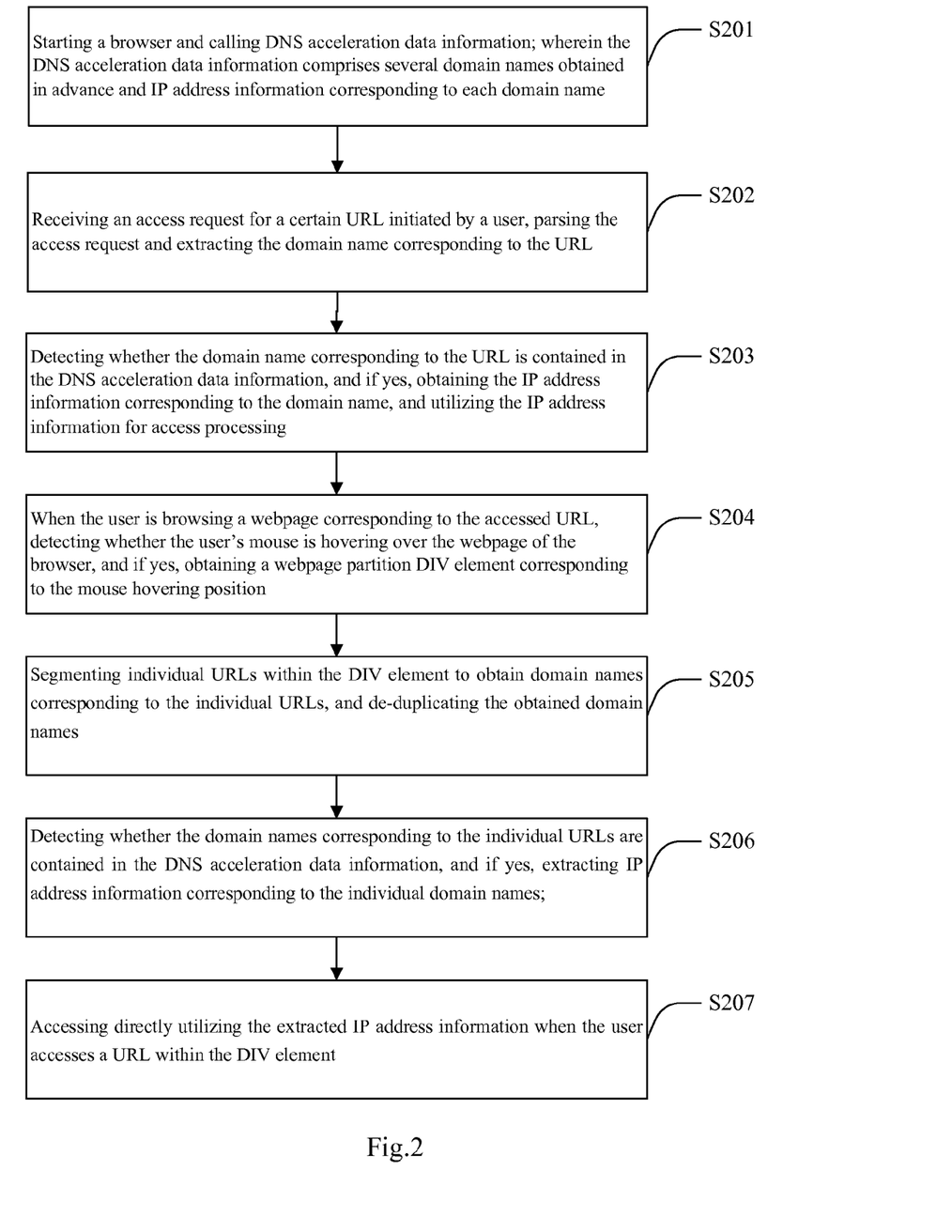
FIG. 2 is a flow chart of a method for domain name resolution by a browser provided by a second embodiment of the present disclosure.

As shown in FIG. 2, the embodiment of the present disclosure provides a method for domain name resolution by a browser, which method is an extended scheme of the DNS pre-reading method described in the first embodiment, i.e., which method is extended to add a mouse hovering scheme. In the following procedure of elucidation, ways of processing identical to those of the first embodiment will not be repeated here, and the method particularly comprises:

step S201: starting a browser and calling DNS acceleration data information, wherein the DNS acceleration data information comprises several domain names obtained in advance and IP address information corresponding to individual domain names;

step S202: receiving an access request for a certain URL initiated by a user, parsing the access request and extracting a domain name corresponding to the URL;

step S203: detecting whether the domain name corresponding to the URL is contained in the DNS acceleration data information, and if yes, obtaining the IP address information corresponding to the domain name, and utilizing the IP address information for access processing;

step S204: when the user is browsing a webpage corresponding to the accessed URL, detecting whether the user's mouse is hovering over the webpage, and if yes, obtaining a webpage partition DIV element corresponding to the mouse hovering position;

step S205: segmenting individual URLs within the DIV element to obtain domain names corresponding to the individual URLs, and de-duplicating the obtained domain names;

step S206: detecting whether the domain names corresponding to the individual URLs are contained in the DNS acceleration data information, and if yes, extracting IP address information corresponding to the individual domain names; and step S207: accessing directly utilizing the extracted IP address information when the user accesses a URL within the DIV element.

To sum up, by conducting statistics on some primary domain names in advance to form DNS acceleration data information, the technical solution of the present disclosure may implement webpage browsing acceleration when the DNS acceleration data information is called by a user-side browser, and such a procedure of acceleration processing consumes a short time, and improves the efficiency of DNS acceleration;

in addition, the technical solution of the present disclosure may further perform acceleration processing on a URL where a mouse hovers, and have a wide range of applications.

Third Embodiment

The embodiment of the present disclosure provides a method for domain name resolution by a browser, which method is a further elaboration of the methods described in the first embodiment and the second embodiment and particularly comprises the following steps.

I. Step of Generating DNS Acceleration Data Information

When the information is generated at a server side, the step comprises:

1) collecting primary domain names and configuring a primary domain name pool utilizing the collected primary domain names;

wherein the way of collecting primary domain names and configuring a primary domain name pool comprises, but is not limited to, receiving individual primary domain names reported by a user side, and/or obtaining whole network hotspot domain name information and taking use of primary domain names with a top N visit volume to configure the primary domain name pool, N being a positive integer;

2) selecting individual primary domain names one by one in the primary domain name pool, intercepting the system function getaddrinfo( )) and obtaining secondary sub-domain names corresponding to respective primary domain names and IP address information of the primary domain names and the individual secondary sub-domain names.

In this step, the intercepted system function is the function getaddrinfo(const char *nodename, const char *service, const struct addrinfo *hints, struct addrinfo **result).

Wherein, nodename is a domain name to be parsed (in ASCII format); service is an ANSI string containing a service name or port; hints is a network socket hint data structure indicating a network protocol family, a type of socket, and a protocol etc.; and result is a data structure returned by parsing, which is used for saving data parsed by the system.

If the function getaddrinfo returns successfully, then the variable pointed to by the argument result is already filled with a pointer which points to an addrinfo structure chain table cascaded by members ai_next therein. There are the following two situations which may result in returning multiple addrinfo structures:

1. there are multiple addresses associated with the argument nodename, and then each address suitable for the requested address cluster returns a corresponding structure; and 2. the service specified by the argument service supports multiple types of socket, and then each type of socket may return a corresponding structure, which in particular depends on the member ai_socktype of the structure hints.

In the embodiment of the present disclosure, a structure hints is allocated before the function getaddrinfo is intercepted, it is filled with a required field after it is reset, then the function getaddrinfo( ) is intercepted to obtain secondary sub-domain names corresponding to respective primary domain names, and socket address structures corresponding to the primary domain names and the individual secondary sub-domain names, and then IP address information corresponding to the primary domain names and the individual secondary sub-domain names is obtained according to the socket address structures.

By exploiting the technical feature that the function getaddrinfo( ) may convert a host name and a service name into a socket address structure, the embodiment of the present disclosure obtains secondary sub-domain names corresponding to the individual primary domain names within the primary domain name pool and the IP address information corresponding to the individual domain names.

3) saving the obtained individual primary domain names, the secondary sub-domain names corresponding thereto, and the IP address information of the primary domain names and the individual secondary sub-domain names in the DNS acceleration data information.

Figure 3:
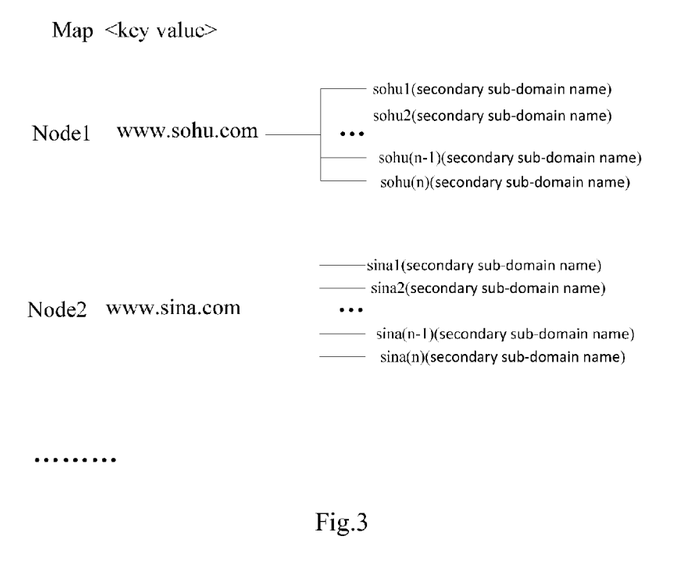
FIG. 3 is a mapping relation diagram of a map table established in a third embodiment of the present disclosure.

In this step, when saving the primary domain names and their corresponding secondary sub-domain names, a map table of the mapping relation between the primary domain names and the corresponding individual secondary sub-domain names is established, and the particular mapping relation is as shown in FIG. 3.

When generated at the browser side, the DNS acceleration data information is DNS acceleration data information obtained by the browser conducting statistics on URLs accessed by a user(s).

Wherein, the way of the browser obtaining the DNS acceleration data information comprises:

obtaining a URL accessed by a user and extracting the primary domain name corresponding to the URL;

intercepting the system function getaddrinfo( ), and obtaining secondary sub-domain names corresponding to the primary domain names, and socket address structures corresponding to the primary domain names and the individual secondary sub-domain names;

obtaining the IP address information corresponding to the primary domain names and the individual secondary sub-domain names according to the socket address structures; and storing the primary domain names, the individual secondary sub-domain names corresponding to the primary domain names, and the IP address information corresponding to the individual domain names in the DNS acceleration data information. Wherein, when saving the primary domain names and their corresponding secondary sub-domain names, a map table of the mapping relation between the primary domain names and the corresponding individual secondary sub-domain names is established, and the particular mapping relation continues to be as shown in FIG. 3.

II. Step of DNS Acceleration 1. starting a browser and calling DNS acceleration data information;

wherein the called DNS acceleration data information is DNS acceleration data information downloaded at a server side, or received DNS acceleration data information pushed actively by the server side, and/or the called DNS acceleration data information is DNS acceleration data information obtained by the browser conducting statistics on URLs accessed by a user(s);

2. when the address bar of the browser is changed, i.e., a user initiates an access request for a certain URL, parsing the access request and obtaining the URL to be accessed;

wherein that the address bar is changed refers to an input in the address bar by a user or a URL recommended automatically by the address bar;

3. judging whether the URL to be accessed is a URL that the system has already cached, and if yes, it meaning that the object corresponding to the URL has not expired, the information cached by the local system may be used directly and at this time there is no need for DNS acceleration processing; and if no, performing step 4;

4. segmenting the URL to obtain a domain name corresponding to the URL, and searching the domain name in the DNS acceleration data information, and when it is searched out, performing step 5; and if it is not searched out, processing according to a normal access flow.

For example, when the user is browsing a webpage, he will click a connection of a secondary domain name under a primary domain name, and at this point, the secondary domain name will be obtained, the URL will be segmented, and a search for the mapping relation of the primary domain names and the secondary domain names after segmentation will be done according to the map table within the DNS acceleration data information.

5. calling the function DnsAccelerate( ) and inserting a domain name to be accelerated into an acceleration list.

This step lies in particular in that:

The function DnsAccelerate( ) calls the Windows system function QueueUserWorkItem( ), and informs a queue daemon thread that there is a domain name to be accelerated.

The queue daemon thread calls the function ParallelGetAddrInfoProc( ) to perform the following operations:

calling the function CreateSemaphore to create a semaphore;

calling ::QueueUserWorkItem(GetAddrInfoSysProc,&pParseDataArray[index], 0) to parse the domain name; the procedure of calling the function is namely the procedure of searching the IP address corresponding to the domain name to be accelerated in the DNS acceleration data information; and waiting for the completion of all the tasks in the queue.

Figure 4:
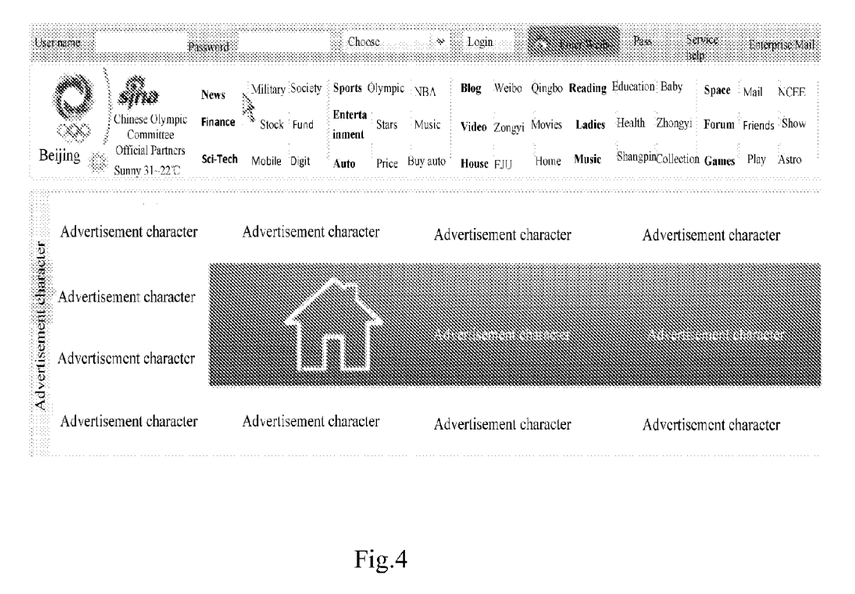
FIG. 4 is a schematic diagram of a mouse hovering in the third embodiment of the present disclosure.

6. when the domain name acceleration is finished, obtaining IP address information corresponding to the URL to be accessed, and utilizing the IP address information for access processing;

7. when the user is browsing a webpage corresponding to the URL, detecting whether the user's mouse is hovering over the currently browsed webpage, and if yes, obtaining a webpage partition DIV element corresponding to the mouse hovering position; wherein a schematic diagram of mouse hovering is as shown in FIG. 4;

8. segmenting individual URLs within the DIV element to obtain domain names corresponding to the individual URLs, and de-duplicating the obtained domain names;

9. detecting whether the domain names corresponding to the individual URLs are contained in the DNS acceleration data information, and if yes, extracting IP address information corresponding to the individual domain names, and accessing directly utilizing the extracted IP address information when the user accesses a URL within the DIV element.

The mouse hovering scheme is illustrated as follows.

The current position of the mouse and a URL link of a sub-element covered by the mouse in a webpage element are detected. For example, the mouse is currently located at

```
<div class="nav_2">
  <ul>
    <li><a href="http://news.sina.com.cn/"><b>news</b></a></li>
    <li><a href="http://mil.news.sina.com.cn">military</a></li>
    <li><a href="http://news.sina.com.cn/society/">society</a></li>
  </ul>
  <ul>
    <li><a href="http://finance.sina.com.cn/"><b>finance </b></a></li>
    <li><a href="http://finance.sina.com.cn/stock/">stock</a></li>
    <li><a href="http://finance.sina.com.cn/fund/">fund</a></li>
  </ul>
  <ul>
    <li><a href="http://tech.sina.com.cn/"><b>tech</b></a></li>
    <li><a href="http://mobile.sina.com.cn/">mobile</a></li>
    <li><a href="http://digi.sina.com.cn/">digit</a></li>
  </ul>
</div>.
```

When the mouse is hovering over <a href="http://mobile.sina.com.cn/"> in the above DIV elements, DNS acceleration processing will be performed for the URL of the DIV.

A URL corresponding to a hovering point refers here to a URL de-duplication set in <div . . . > . . . </div>, e.g., news.sina.com.cn; mil.news.sina.com.cn; finance.sina.com.cn; tech.sina.com.cn; mobile.sina.com.cn; digi.sina.com.cn.

Fourth Embodiment

Figure 5:
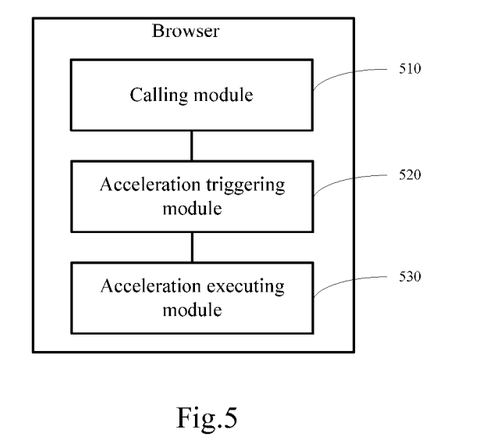
FIG. 5 is a structural schematic diagram of a browser provided by a fourth embodiment of the present disclosure.

As shown in FIG. 5, the embodiment of the present disclosure provides a browser comprising: a calling module 510, an acceleration triggering module 520 and an acceleration executing module 530; wherein the calling module 510, configured to start a browser and call DNS acceleration data information, wherein the DNS acceleration data information comprises several domain names obtained in advance and IP address information corresponding to individual domain names;

furthermore, the several domain names obtained in advance saved in the DNS acceleration data information called by the calling module 510 comprise several primary domain names and a sub-domain name corresponding to each primary domain name;

furthermore, a map table is established in the DNS acceleration data information called by the calling module 510, and the mapping relation between the primary domain names and the corresponding individual sub-domain names is contained in the map table;

furthermore, the DNS acceleration data information called by the calling module 510 is DNS acceleration data information downloaded at a server side; or received DNS acceleration data information pushed actively by the server side, and/or DNS acceleration data information obtained by the browser conducting statistics on URLs accessed by a user(s);

when the DNS acceleration data information is DNS acceleration data information obtained by the browser conducting statistics on URLs accessed by a user(s), the browser implements the generation of the DNS acceleration data information particularly via the following modules:

an obtaining module configured to obtain a URL accessed by the user and extract a domain name corresponding to the URL;

a function calling module configured to intercept the function of obtaining address information of the computer system at the browser side, and obtain sub-domain names corresponding to the primary domain names, and socket address structures corresponding to the primary domain names and the individual sub-domain names;

an information obtaining module configured to obtain the IP address information corresponding to the primary domain names and the individual sub-domain names according to the socket address structures; and an information storage module configured to store the primary domain names, the individual sub-domain names corresponding to the primary domain names, and the IP address information corresponding to the individual domain names in the DNS acceleration data information;

the acceleration triggering module 520, configured to receive an access request for a certain URL initiated by a user, parse the access request, and extract a domain name corresponding to the URL, and trigger the acceleration executing module 530;

furthermore, the acceleration triggering module 520 is further configured to, before extracting a domain name corresponding to the URL, judge whether the URL has been cached locally, and if no, then extract a domain name corresponding to the URL;

the acceleration executing module 530, configured to detect whether the domain name corresponding to the URL is contained in the DNS acceleration data information, and if yes, obtain the IP address information corresponding to the domain name and utilize the IP address information for access processing;

furthermore, the acceleration executing module 530 particularly comprises:

a domain name detecting sub-module 531 configured to judge whether the domain name corresponding to the URL is a primary domain name or a sub-domain name, if it is a primary domain name, trigger a searching sub-module, and if it is a sub-domain name, trigger a domain name processing sub-module;

a domain name processing sub-module 532 configured to segment the obtained sub-domain name to obtain a primary domain name corresponding to the sub-domain name, and take the primary domain name as a search index, trigger a searching sub-module; and a searching sub-module 533 configured to search a corresponding domain name in the map table;

furthermore, the acceleration executing module 530 is particularly configured to insert the domain name corresponding to the URL into a to-be-accelerated list, and inform a queue daemon thread, create a semaphore by the queue daemon thread, and call the IP address corresponding to the domain name in the DNS acceleration data information, realize the parsing of the domain name; and furthermore, the acceleration executing module 530 is further configured to, when IP address information corresponding to multiple domain names is obtained concurrently, utilize the queue daemon thread to inform a pre-created thread pool to allocate threads to individual request tasks for obtaining IP address information, and utilize the allocated individual threads to call the IP address information in the DNS acceleration data information, thereby realize the parsing of the individual domain names.

To sum up, by conducting statistics on some primary domain names in advance to form DNS acceleration data information, the browser described in the embodiment of the present disclosure may implement webpage browsing acceleration when the DNS acceleration data information is called by a user-side browser, and such a procedure of acceleration processing consumes a short time, and improves the efficiency of DNS acceleration.

Fifth Embodiment

Figure 6:
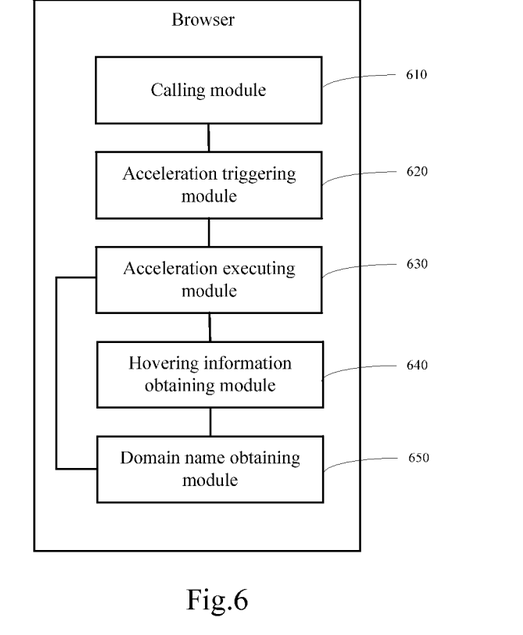
FIG. 6 is a structural schematic diagram of a browser provided by a fifth embodiment of the present disclosure.

As shown in FIG. 6, the embodiment of the present disclosure provides a browser which is an extension of the scheme of the browser described in the fourth embodiment, i.e., which is extended to add a mouse hovering scheme. In the following procedure of elucidation, ways of processing identical to those of the fourth embodiment will not be repeated here, and the browser particularly comprises: a calling module 610, an acceleration triggering module 620, an acceleration executing module 630, a hovering information obtaining module 640 and a domain name obtaining module 650; wherein the calling module 610, configured to start a browser and call DNS acceleration data information, wherein the DNS acceleration data information comprises several domain names obtained in advance and IP address information corresponding to individual domain names;

the acceleration triggering module 620, configured to receive an access request for a certain URL initiated by a user, parse the access request, and extract a domain name corresponding to the URL, and trigger the acceleration executing module 630;

the acceleration executing module 630, configured to detect whether the domain name corresponding to the URL is contained in the DNS acceleration data information, and if yes, obtain the IP address information corresponding to the domain name and utilize the IP address information for access processing;

the hovering information obtaining module 640, configured to, when the user is browsing a webpage corresponding to the accessed URL, detect whether the user's mouse is hovering over the webpage of the browser, and if yes, obtain a webpage partition DIV element corresponding to the mouse hovering position; and the domain name obtaining module 650, configured to segment individual URLs within the DIV element to obtain domain names corresponding to the individual URLs, and de-duplicate the obtained domain names, and trigger the acceleration executing module 630 to extract IP address information corresponding to the individual domain names for use in subsequently accessing individual URLs within the DIV element by the user.

To sum up, by conducting statistics on some primary domain names in advance to form DNS acceleration data information, the browser of the invention may implement webpage browsing acceleration when the DNS acceleration data information is called by a user-side browser, and such a procedure of acceleration processing consumes a short time, and improves the efficiency of DNS acceleration;

in addition, the browser of the invention may further perform acceleration processing on a URL where a mouse hovers, and have a wide range of applications.

Sixth Embodiment

Figure 7:
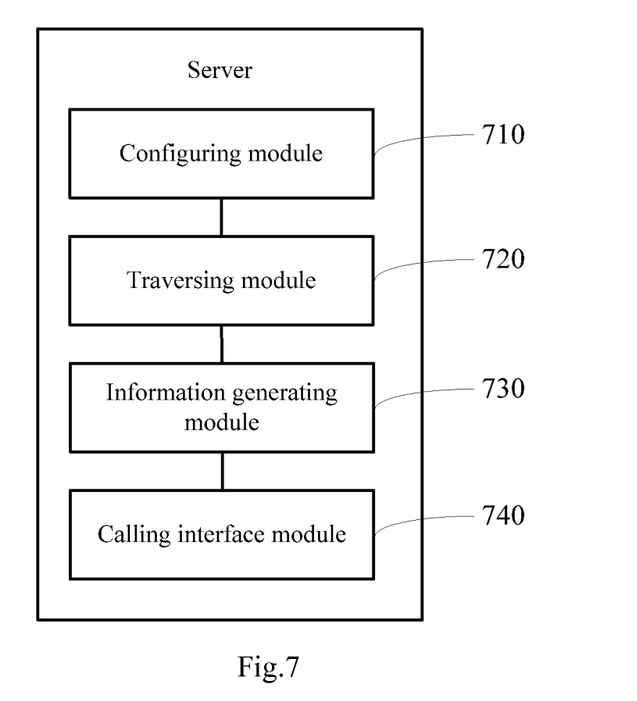
FIG. 7 is a structural schematic diagram of a server provided by a sixth embodiment of the present disclosure.

As shown in FIG. 7, the embodiment of the present disclosure further provides a server comprising: a configuring module 710, a traversing module 720, an information generating module 730 and a calling interface module 740; wherein the configuring module 710, configured to collect primary domain names and configure a primary domain name pool utilizing the collected primary domain names;

furthermore, the configuring module 710 is particularly configured to receive individual primary domain names reported by a user-side browser, and configure the primary domain name pool based on the individual primary domain names; and/or obtain whole network hotspot domain name information and take use of primary domain names with a top N visit volume to configure the primary domain name pool, N being a positive integer;

furthermore, the configuring module 710 is further configured to, when there is a new primary domain name entering the pool, and/or when there is a primary domain name which is changed in the primary domain name pool, trigger the information obtaining module to obtain a sub-domain name corresponding to the new primary domain name and the changed primary domain name, and IP address information corresponding to the primary domain names and the individual sub-domain names, and trigger the information generating module 730 to update the DNS acceleration data information;

the traversing module 720, configured to select primary domain names one by one in the primary domain name pool, and obtain sub-domain names corresponding to the primary domain names and IP address information corresponding to the primary domain names and the individual sub-domain names;

furthermore, the traversing module 720 particularly comprises:

a domain name traversing sub-module 721 configured to select primary domain names one by one in the primary domain name pool;

a statistical sub-module 722 configured to intercept the function of obtaining address information (e.g., the system function getaddrinfo( )) of the computer system at the browser side, and obtain a sub-domain name corresponding to each of the primary domain names, and socket address structures corresponding to the primary domain names and the individual sub-domain names;

an address obtaining sub-module 723 configured to obtain the IP address information corresponding to the primary domain names and the individual sub-domain names according to the socket address structures;

the information generating module 730, configured to save the primary domain names, their corresponding sub-domain names, and the IP address information of the individual domain names, and generate DNS acceleration data information;

furthermore, when generating DNS acceleration data information, the information generating module 730 further establishes a map table of the mapping relation between the primary domain names and the corresponding individual secondary sub-domain names;

the calling interface module 740, configured to send the DNS acceleration data information to the user-side browser; and furthermore, the call interface module 740 is particularly configured to, when the user-side browser starts, actively push the DNS acceleration data information to the user-side browser; or when receiving a download request of the user-side browser, send the DNS acceleration data information to the user-side browser.

To sum up, the server described in the embodiment of the present disclosure is used to generate DNS acceleration data information which is for being called by the user-side browser, thereby realizing DNS acceleration processing of the user-side browser.

Seventh Embodiment

Figure 8:
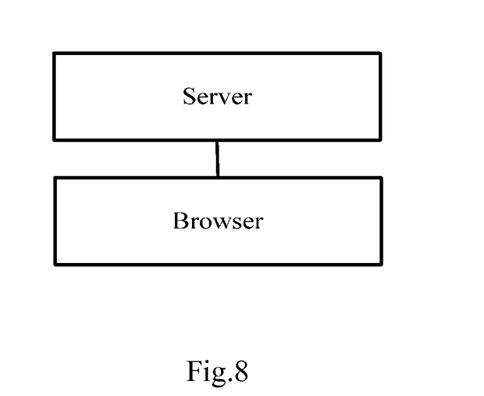
FIG. 8 is a structural block diagram of a system for domain name resolution by a browser provided by a seventh embodiment of the present disclosure.

As shown in FIG. 8, the embodiment of the present disclosure further provides a system configured to pre-read a domain name system DNS comprising a browser as described in the fourth or fifth embodiment, and a server as described in the sixth embodiment.

To sum up, by conducting statistics on some primary domain names in advance at the server side to form DNS acceleration data information, the system of the invention may implement webpage browsing acceleration when the DNS acceleration data information is called by a user-side browser, and such a procedure of acceleration processing consumes a short time, and improves the efficiency of DNS acceleration;

In addition, the system of the invention may further perform acceleration processing on a URL where a mouse hovers, and have a wide range of applications.

The algorithms and displays provided here are not inherently related to any specific computer, virtual system or other device. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

For a device embodiment, it is described relatively simply due to its essential similarity to a method embodiment, and as for its relevant parts reference may be made to the description of the parts of the method embodiment.

The individual embodiments in the specification are described using a progressive manner, each embodiment highlights its difference from other embodiments, and identical or similar parts of the individual embodiments may be referred relative to each other.

Embodiments of the individual components of the invention may be implemented in hardware, or in a software module running on one or more processors, or in a combination thereof. It will be appreciated by those skilled in the art that, in practice, some or all of the functions of some or all of the components in a browser device for domain name resolution according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 9:
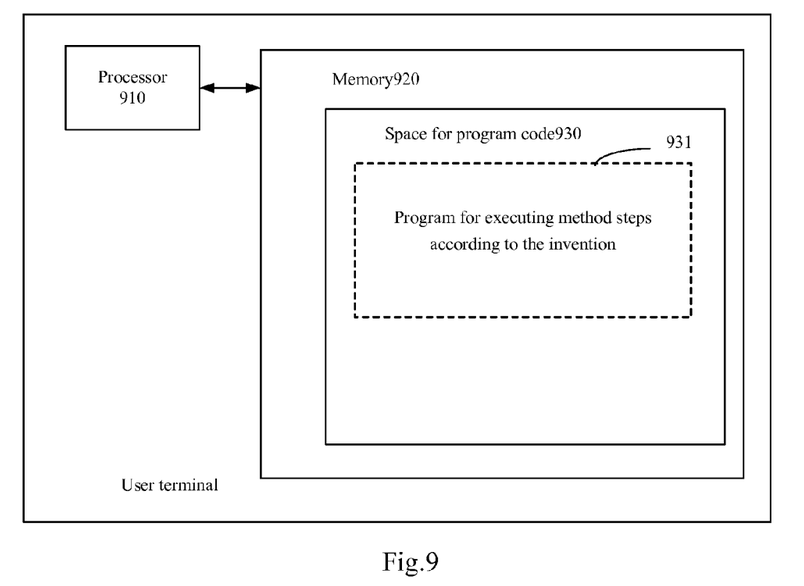
FIG. 9 shows schematically a block diagram of a user terminal configured to perform a method according to the present disclosure.
Figure 10:
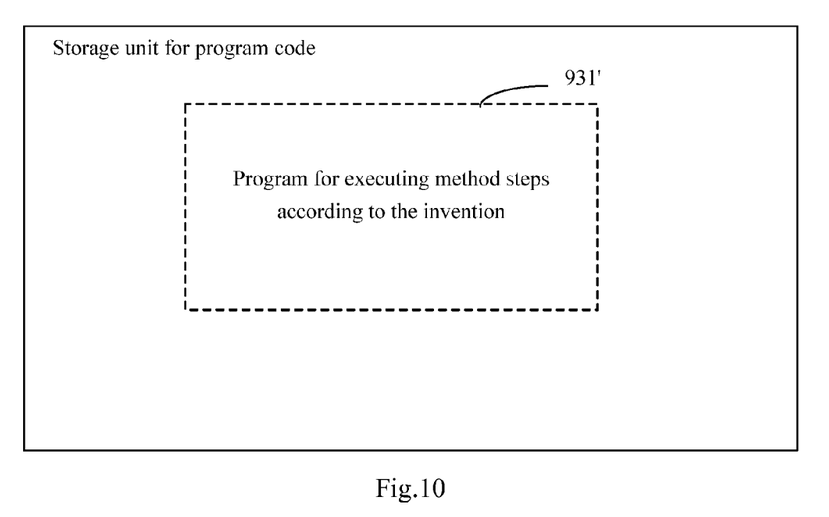
FIG. 10 shows schematically a storage unit configured to retain or carry a program code implementing a method according to the present disclosure.

For example, FIG. 9 shows a user terminal which may carry out a method for domain name resolution by a browser according to the embodiment of present disclosure. The user terminal traditionally comprises a processor 910 and a computer program product or a computer readable medium in the form of a memory 920. The memory 920 may be an electronic memory such as a flash memory, an EEPROM (electrically erasable programmable read-only memory), an EPROM, a hard disk or a ROM. The memory 920 has a memory space 930 for a program code 931 for carrying out any method steps in the methods as described above. For example, the memory space 930 for a program code may comprise individual program codes 931 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 10. The storage unit may have a memory segment, a memory space, etc. arranged similarly to the memory 920 in the user terminal of FIG. 9. The program code may for example be compressed in an appropriate form. In general, the storage unit comprises a computer readable code 931', i.e., a code which may be read by e.g., a processor such as 910, and when run by a user terminal, the codes cause the user terminal to carry out individual steps in the methods described above.

"An embodiment", "the embodiment" or "one or more embodiments" mentioned herein implies that a particular feature, structure or characteristic described in connection with an embodiment is included in at least one embodiment of the present disclosure. In addition, it is to be noted that, examples of a phrase "in an embodiment" herein do not necessarily all refer to one and the same embodiment.

In the specification provided herein, a plenty of particular details are described. However, it can be appreciated that an embodiment of the present disclosure may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for domain name resolution by a browser, the method comprising:
   starting, by a processor, the browser and calling DNS acceleration data information, wherein the DNS acceleration data information comprises several domain names obtained in advance and IP address information corresponding to each domain name;
   receiving, by the processor, an access request for a certain URL initiated by a user, parsing the access request and extracting the domain name corresponding to the URL;
   detecting, by the processor, whether the domain name corresponding to the URL is contained in the DNS acceleration data information, and if the domain name corresponding to the URL is contained in the DNS acceleration data information, obtaining the IP address information corresponding to the domain name, and utilizing the IP address information for access processing;

when the user is browsing a webpage corresponding to the URL, obtaining, by the processor, a certain webpage partition DIV element in the webpage;

segmenting, by the processor, individual URLs within the DIV element to obtain domain names corresponding to the individual URLs; and detecting, by the processor, that the domain names corresponding to the individual URLs are contained in the DNS acceleration data information, extracting IP address information corresponding to the individual domain names, and directly utilizing the extracted IP address information when the user accesses a URL within the DIV element.

2. The method as claimed in claim 1, wherein the several domain names obtained in advance in the DNS acceleration data information comprise several primary domain names and sub-domain names corresponding to each primary domain name.

3. The method as claimed in claim 2, wherein the information in the DNS acceleration data information is stored in a map table, and the map table comprises the mapping relation between the primary domain names and the corresponding sub-domain names.

4. The method as claimed in claim 3, wherein the detecting whether the domain name corresponding to the URL is contained in the DNS acceleration data information further comprises:

determining whether the domain name corresponding to the URL is a primary domain name or a sub-domain name, if the domain name corresponding to the URL is the primary domain name, searching the domain name directly in the map table, and if the domain name corresponding to the URL is the sub-domain name, segmenting the sub-domain name to obtain the primary domain name corresponding to the sub-domain name, taking the primary domain name as a search index, and searching a corresponding domain name in the map table.

5. The method as claimed in claim 1, wherein before extracting the domain name corresponding to the URL, the method further comprises: determining whether the URL has been cached locally, and if not, extracting the domain name corresponding to the URL.

6. The method as claimed in claim 1, wherein, the certain webpage partition DIV element is a webpage partition DIV element corresponding to a mouse hovering position;

after the segmenting individual URLs within the DIV element to obtain domain names corresponding to the individual URLs, the method further comprises:
de-duplicating the obtained domain names.

7. The method as claimed in claim 1, wherein when it is detected that the domain name corresponding to the URL is contained in the DNS acceleration data information, the extracting the IP address information corresponding to the domain name comprises:

inserting the domain name corresponding to the URL into a to-be-accelerated list, and informing a queue daemon thread; and the queue daemon thread creating a semaphore, and calling the IP address information of the domain name corresponding to the URL in the DNS acceleration data information, realizing the parsing of the domain name.

8. The method as claimed in claim 7, wherein the method further comprises:

when IP address information corresponding to multiple domain names is obtained concurrently, utilizing the queue daemon thread to inform a pre-created thread pool to allocate threads to individual request tasks for obtaining IP address information, and utilizing the allocated individual threads to call the IP address information in the DNS acceleration data information, thereby realizing the parsing of the individual domain names.

9. The method as claimed in claim 1, wherein the DNS acceleration data information is downloaded at a server; or
the DNS acceleration data information is pushed actively by the server; and/or
the DNS acceleration data information is obtained by the browser conducting statistics on URLs accessed by a user.

10. The method as claimed in claim 9, wherein the browser obtaining the DNS acceleration data information comprises:

obtaining the URL accessed by the user and extracting a primary domain name corresponding to the URL;
intercepting the obtaining address information at the browser, and obtaining sub-domain names corresponding to the primary domain name, and socket address structures corresponding to the primary domain name and individual sub-domain names;
obtaining the IP address information corresponding to the primary domain name and the individual sub-domain names according to the socket address structures; and
storing the primary domain name, the individual sub-domain names corresponding to the primary domain name, and the IP address information corresponding to the individual domain names in the DNS acceleration data information.

11. A system comprising:
a memory having instructions stored thereon;
a processor to execute the instructions to perform operations for domain name resolution, the operations comprising:
starting a browser and calling DNS acceleration data information, wherein the DNS acceleration data information comprises several domain names obtained in advance and IP address information corresponding to each domain name;
receiving an access request for a certain URL initiated by a user, parsing the access request and extracting the domain name corresponding to the URL detecting whether the domain name corresponding to the URL is contained in the DNS acceleration data information, and if the domain name corresponding to the URL is contained in the DNS acceleration data information, obtaining the IP address information corresponding to the domain name, and utilizing the IP address information for access processing;
when the user is browsing a webpage corresponding to the URL, obtaining a certain webpage partition DIV element in the webpage;
segmenting individual URLs within the DIV element to obtain domain names corresponding to the individual URLs; and
detecting that the domain names corresponding to the individual URLs are contained in the DNS acceleration data information, extracting IP address information corresponding to the individual domain names, and directly utilizing the extracted IP address information when the user accesses a URL within the DIV element.

12. The system as claimed in claim 11, wherein the several domain names obtained in advance in the DNS acceleration data information comprise several primary domain names and sub-domain names corresponding to each primary domain name.

13. The system as claimed in claim 12, wherein the information in the DNS acceleration data information is stored in a map table, and the map table comprises the mapping relation between the primary domain names and the corresponding sub-domain names.

14. The system as claimed in claim 13, wherein the detecting whether the domain name corresponding to the URL is contained in the DNS acceleration data information further comprises:
   determining whether the domain name corresponding to the URL is a primary domain name or a sub-domain name, if the domain name corresponding to the URL is the primary domain name, searching the domain name directly in the map table; and if the domain name corresponding to the URL is the sub-domain name, segmenting the sub-domain name to obtain the primary domain name corresponding to the sub-domain name, taking the primary domain name as a search index, and searching a corresponding domain name in the map table.

15. The system as claimed in claim 11, wherein, the certain webpage partition DIV element is a webpage partition DIV element corresponding to a mouse hovering position; and
   after the segmenting individual URLs within the DIV element to obtain domain names corresponding to the individual URLs, the method further comprises:
   de-duplicating the obtained domain names.

16. The system as claimed in claim 11, wherein when detected that the domain name corresponding to the URL is contained in the DNS acceleration data information, the extracting the IP address information corresponding to the domain name comprises:
   inserting the domain name corresponding to the URL into a to-be-accelerated list, and informing a queue daemon thread;
   creating a semaphore by the queue daemon thread, calling the IP address corresponding to the domain name corresponding to the URL in the DNS acceleration data information, and realizing the parsing of the domain name.

17. The system as claimed in claim 16, wherein the operations further comprise:
   when IP address information corresponding to multiple domain names is obtained concurrently, utilizing the queue daemon thread to inform a pre-created thread pool to allocate threads to individual request tasks for obtaining IP address information, and utilizing the allocated individual threads to call the IP address information in the DNS acceleration data information, thereby realizing the parsing of the individual domain names.

18. The system as claimed in claim 11, wherein the DNS acceleration data information is downloaded at a server; or pushed actively by the server; and/or obtained by the browser conducting statistics on URLs accessed by a user.

19. The system as claimed in claim 18, wherein the browser obtaining the DNS acceleration data information comprises:
   obtaining the URL accessed by the user and extracting a primary domain name corresponding to the URL;
   intercepting the obtaining address information at the browser, and obtaining sub-domain names corresponding to the primary domain name, and socket address structures corresponding to the primary domain name and individual sub-domain names;
   obtaining the IP address information corresponding to the primary domain name and the individual sub-domain names according to the socket address structures; and
   storing the primary domain name, the individual sub-domain names corresponding to the primary domain name, and the IP address information corresponding to the individual domain names in the DNS acceleration data information.

20. A non-transitory computer readable medium having instructions stored thereon that, when executed by at least one processor, cause the at least one processor to perform operations for domain name resolution by a browser, the operations comprising:
   starting the browser and calling DNS acceleration data information, wherein the DNS acceleration data information comprises several domain names obtained in advance and IP address information corresponding to each domain name;
   receiving an access request for a certain URL initiated by a user, parsing the access request and extracting the domain name corresponding to the URL;
   detecting whether the domain name corresponding to the URL is contained in the DNS acceleration data information, and if the domain name corresponding to the URL is contained in the DNS acceleration data information, obtaining the IP address information corresponding to the domain name, and utilizing the IP address information for access processing;
   when the user is browsing a webpage corresponding to the URL, obtaining a certain webpage partition DIV element in the webpage;
   segmenting individual URLs within the DIV element to obtain domain names corresponding to the individual URLs; and
   detecting that the domain names corresponding to the individual URLs are contained in the DNS acceleration data information, extracting IP address information corresponding to the individual domain names, and directly utilizing the extracted IP address information when the user accesses a URL within the DIV element.

* * * * *